March 7, 1961 D. C. BROWN 2,973,931
DUAL PURPOSE NESTING TYPE PALLETS
Filed April 23, 1958 4 Sheets-Sheet 1
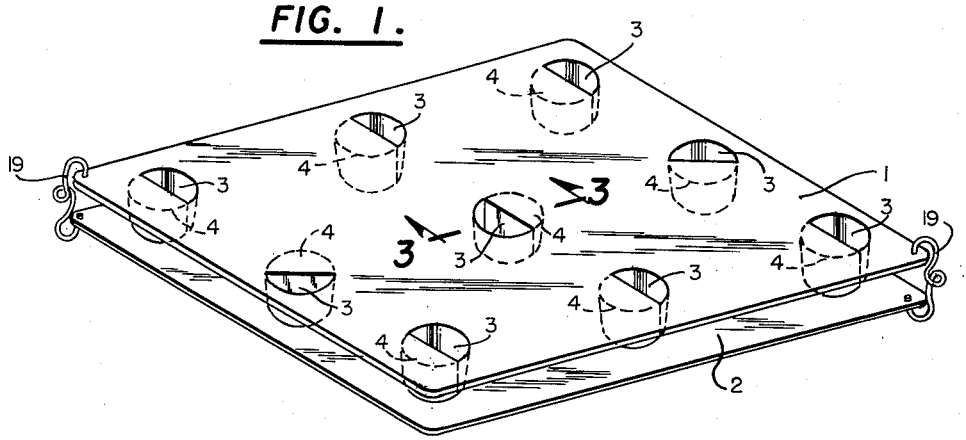
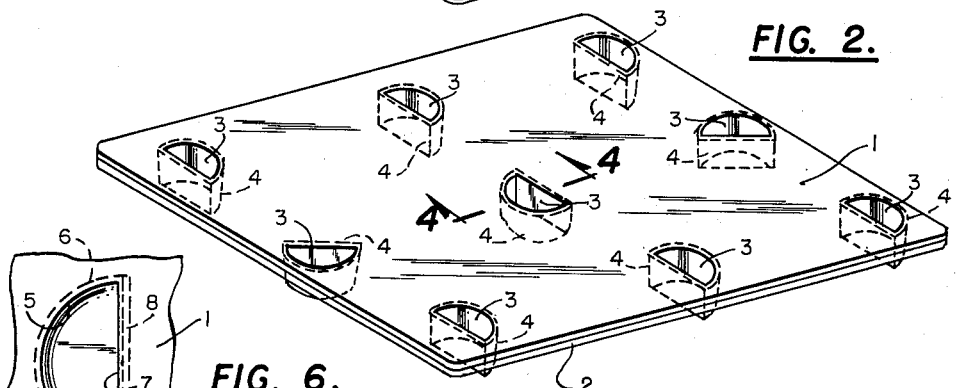
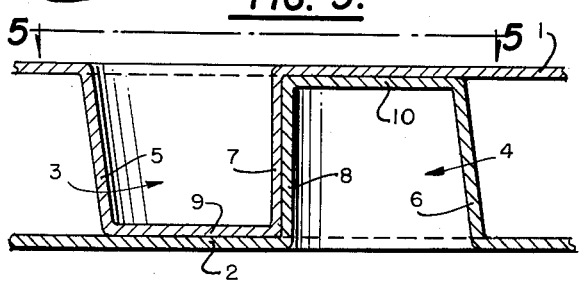
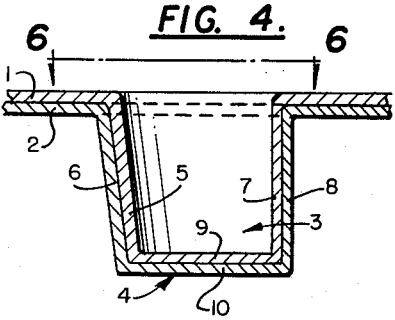
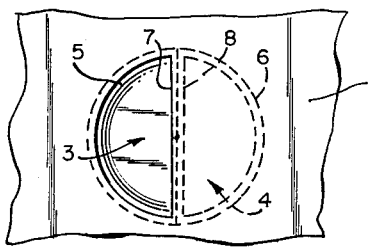
INVENTOR
Dwight C. Brown
BY *John Boyle*
ATTORNEY March 7, 1961  D. C. BROWN  2,973,931
DUAL PURPOSE NESTING TYPE PALLETS
Filed April 23, 1958  4 Sheets-Sheet 2

INVENTOR.
Dwight C. Brown
BY John Boyle
ATTORNEY

March 7, 1961 D. C. BROWN 2,973,931
DUAL PURPOSE NESTING TYPE PALLETS
Filed April 23, 1958 4 Sheets-Sheet 3
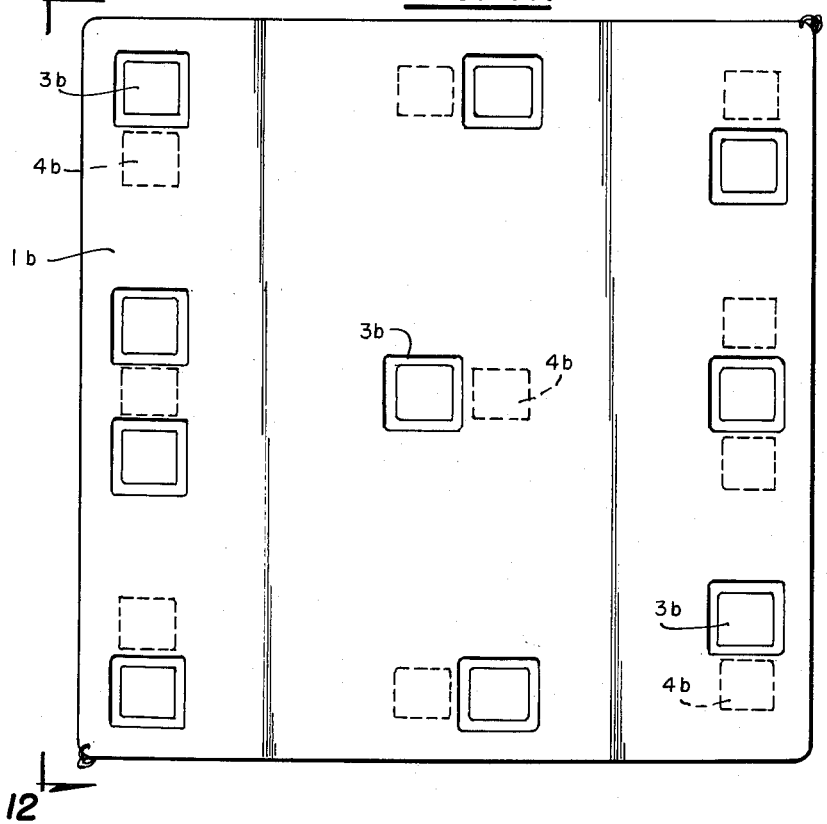
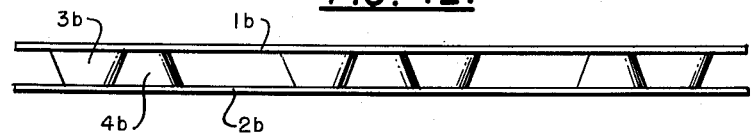
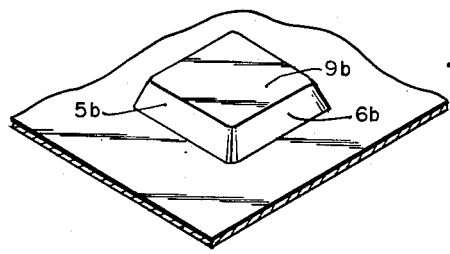
INVENTOR.
Dwight C. Brown
BY
ATTORNEY March 7, 1961 D. C. BROWN 2,973,931
DUAL PURPOSE NESTING TYPE PALLETS
Filed April 23, 1958 4 Sheets-Sheet 4
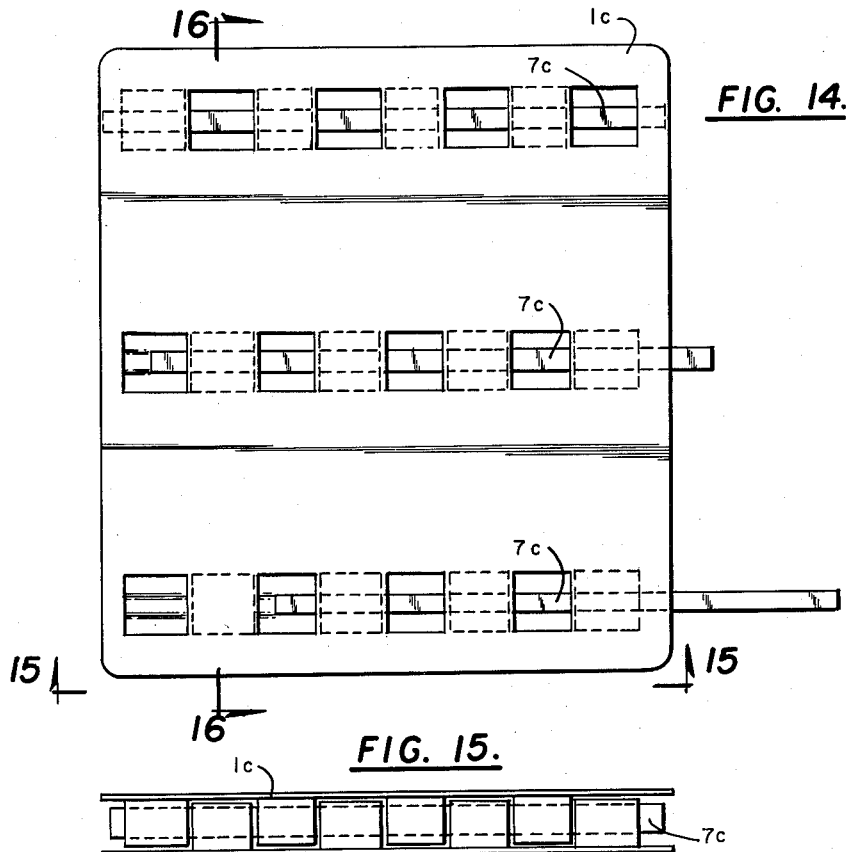
FIG. 14.
FIG. 15.
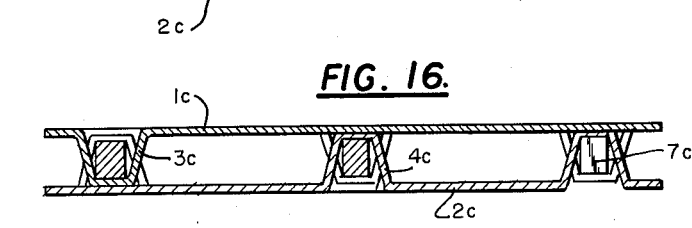
FIG. 16.
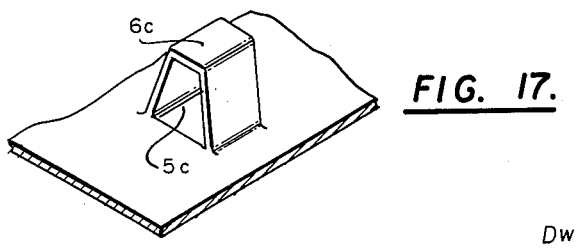
FIG. 17.
INVENTOR.
Dwight C. Brown
BY John Boyd
ATTORNEY United States Patent Office 2,973,931
Patented Mar. 7, 1961

2,973,931
DUAL PURPOSE NESTING TYPE PALLETS
Dwight C. Brown, 414 N. Granada St., Arlington, Va.
Filed Apr. 23, 1958, Ser. No. 730,503
9 Claims. (Cl. 248—120)
(Granted under Title 35, U.S. Code (1952), sec. 266)

The invention described herein may be manufactured and used by or for the Government of the United States for governmental purposes without the payment to me of any royalty therein in accordance with the provisions of Title 35, United States Code, Section 266.

My inveniton relates to nesting type pallets used in the storage and shipment of equipment and supply items to provide unitized handling by use of fork lift and pallet lift truck equipment. While all the modifications are suitably adapted to fabrication chiefly from metal and plastic type materials, they can also be fabricated in part from other materials including wood and paperboard. The term "paperboard" as used herein refers to and includes corrugated board, fiberboard and other paper and fibrous products that are capable of supporting relatively medium and heavy weight loads. The paperboard material may be treated wholly or in part with resins, inorganic silicates, glues, synthetic rubber compounds, insecticides, corrosion inhibitors, moisture proofing materials, plastics and similar type materials for stiffening and strengthening.

Although the conventional nesting type pallet having support members which fit into each other has space saving features when not in use, not found in the conventional duoble-deck type of pallet, its use is generally restricted due to the limited amount of supporting surface area provided in the bottom of the support members when in use as a double deck pallet. In many applications, this limited support area is insufficient to adequately support other superimposed loads stacked in tier arrangement.

One of the objects of my invention is to provide an improved single deck nesting pallet two units of which can be quickly and easily secured together without the use of tools, to provide a double-deck type of pallet. Thus, a dual-purpose pallet is provided which can be used singly or in an arrangement of two units secured together when more support area is required than that provided by the support members of one single deck pallet. This flexibility makes it adaptable to different type and weight unit loads.

A further object of the invention is to provide a pallet having space saving nesting features which can be used in lieu of the conventional rigid non-nesting double-deck pallets which require considerable more cubic space for storage and transportation when not in use.

Still another object of the invention is to provide a nesting type single deck pallet having support members constructed, arranged and positioned so that two such pallets when secured together form a double deck type pallet with dual interlocking supports fitting flush against the opposed decks of the two assembled units, thus providing maximum support and rigidity.

Referring to the drawings for a more complete disclosure of the invention:

Figure 1 is a top perspective view of two spaced nested pallet decks, each deck having nine half-round nesting support members on one base which interlock when two decks are assembled and spaced to provide a double deck pallet ready for use.

Figure 2 is a top perspective view of two decks of the type shown in Figure 1 in nested position for storage, i.e. when not in use.

Figure 3 is an enlarged detail section along the line of 3—3 of Figure 1 showing the interlocking arrangement of the support members.

Figure 4 is an enlarged detail section along the line 4—4 of Figure 2 showing two half-round support members in nested position when pallets are not in use.

Figure 5 is a reduced plan view of the positioned half-round support members of Figure 3 looking in the direction of line 5—5.

Figure 6 is a reduced plan view of a half-round support of Figure 4 looking in the direction of line 6—6

Figure 11 is a top plan view of another modified form of nesting pallet having rectangular supports in lieu of half-round or triangular supports of Figures 1 and 7.

Figure 12 is an end view of Figure 11 looking in the direction of line 12—12 showing two decks assembled to provide a double deck pallet ready for use.

Figure 13 is a perspective view of a rectangular support member of the pallet of Figure 11.

Figure 14 is a top plan view of still another modified form of nesting pallet having somewhat U shaped support members open on two sides.

Figure 15 is a side view of the interlocking continuous row U shaped support member arrangement when two decks are asesmbled to provide a double deck pallet ready for use.

Figure 16 is a transverse section on the line 16—16 of Figure 14 showing the interlocking U shaped support members of two decks by insertion of locking members which are removable when the pallets are not in use.

Figure 17 is a perspective view of a support member of Figure 14.

Figure 7:
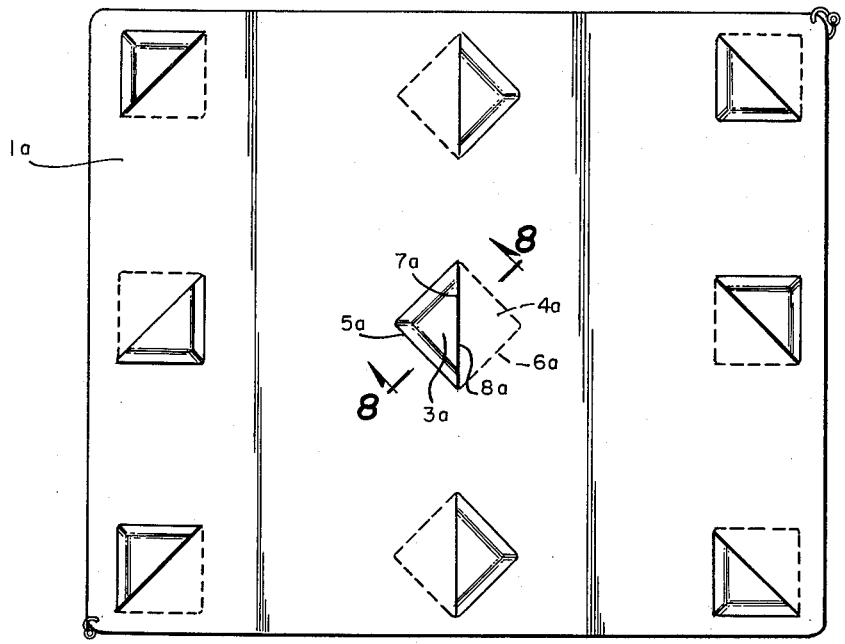
Figure 7 is a top plan view of a modified form of nesting pallet having triangular shaped supports in lieu of the half-round supports illustrated in Figure 1.
Figure 8:
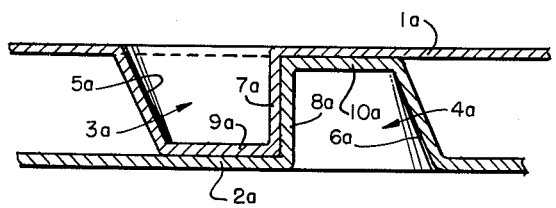
Figure 8 is an enlarged detail section along the line 8—8 of Figure 7, showing the interlocking arrangement of the triangular support members when two decks are assembled to provide a double deck pallet.
Figure 10:
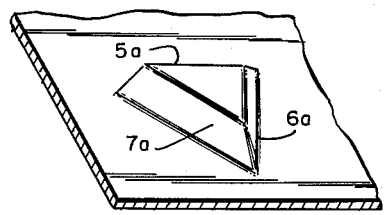
Figure 10 is a perspective view of a nesting triangular support of the pallet of Figure 7.
Figure 9:
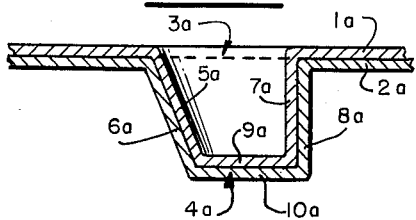
Figure 9 is an enlarged detail section of the nesting arrangement of the triangular supports nested for storage as in Figure 2.

Referring to Figure 1, the decks 1 and 2 have each nine half-round nesting support projections 3 and 4, asymmetrically positioned so as to provide a double support and interlocking arrangement when two pallets, one reversed laterally, are assembled back to back to make up a double deck pallet. This respective asymmetrical positioning is illustrated in Figure 2 which shows two pallets in nesting positioning, i.e. not in use. Three rows of supports are used and the postioning of the supports asymmetrically in each row is such that when two such pallets, one reversed laterally i.e. rotated 180°, are arranged back to back with deck side out and support members extending inwardly, the half-round supports of the top deck line up with those of the bottom deck to form a dual support arrangement, with the two half-round supports taking the shape of a circular support divided in the center by two diameter walls. The arc shaped walls 5 and 6 of the half-round support members 3 and 4 respectively slant from the vertical to provide for nesting. The straight vertical walls 7 and 8 of the half-round supports 3 and 4 respectively have ends which taper downwardly to match ends of the semi-circular slanted support wall. The supporting members 3 and 4 have closed bottoms 9 and 10 respectively. The asymmetrical positioning of the half-round supports of Figure 1 provide a four-way interlocking row arrangement of the support members when two decks are assembled to provide a double deck type pallet with the supports 3 and 4 between the decks 1 and 2. The asymmetrical positioning of the nesting supports in the center support row, i.e. the flat side of the middle support member facing in an opposite direction than the flat side of the support member on each end of the center row, prevents shifting of the spaced decks from left to right and from right to left in the width dimensions. In the same manner the diagonal positioning of the middle support member of the first support row being the exapt opposite of the diagonal positioning of the middle support member of the third row, prevents shifting of the two decks from front to rear and from rear to front on the depth dimension of the pallet.

Normally the two end half-round nesting supports in one end support row would be located closer to the related edge of the pallet deck than the two end half-round supports of the other end support row. This asymmetrical positioning is required to provide proportionate positioning of the formed circular shaped supports when two single decks are assembled back to back to form a double deck pallet. This feature prevents shifting of either deck out of position when handled by fork lift truck and makes it possible to utilize simple type fasteners 19 applied without use of tools to prevent separation of the decks 1 and 2.

Fasteners may be of various designs and types fabricated from various types of materials and may be applied to two or all four corners depending on load requirements. The fasteners 19 are spring clips. The decks 1 and 2 are assembled as shown in Figure 1 to form a double deck type of pallet. The members 3 and 4 are in the position shown in Figure 3, the bottom 9 of member 3 contacting the deck 2 and the bottom 10 of the member 4 contacting the deck 1. The straight sides 7 and 8 are in contact when the decks 1 and 2 are assembled in the nested position of Figures 2 and 4 with the bottom 9 of the member 3 in contact with the bottom 10 of the member 4, the plane surface of the deck 1 being in contact with the plane surface of the deck 2. The straight side 7 of the member 3 is in contact with the straight side 8 of the member 4 and the curved wall 5 of the member 3 is in contact with the curved wall 6 of the member 4.

Referring to the modification of Figures 7–10, there are triangular shaped supporting members 3a and 4a similarly located on the decks 1a and 2a as the half-round members 3 and 4 on the decks 1 and 2 of Figures 1 and 2. The hypotenuse sides 7a and 8a are vertical and the sides 5a and 6a taper inwardly to provide for nesting. The triangular supports 3a and 4a are located asymmetrically on the decks 1a and 2a so as to provide alignment of the opposed matching supports in an interlocking arrangement, when two decks are assembled to provide a double deck type pallet.

Referring to the modifications of Figures 11–13, there are square shaped supporting members 3b and 4b carried by the decks 1b and 2b, similarly located as the half-round members 3 and 4 of Figures 1 and 2. The four sides 5b and 6b of the supports are at an acute angle to the deck. The nesting arrangement when the pallet is not in use or in storage is similar to that of Figures 1 to 4 and 7 to 9.

The asymmetrical positioning of both the triangular and rectangular support members illustrated in Figures 7 and 11 provide the same type of interlocking arrangement as the half-round support of Figure 1, when two decks are assembled back to back to form a double deck pallet. In assembling the double deck pallet, it is essential that one of the two pallets be reversed laterally prior to assembling back to back. This is done by rotating one pallet 180° laterally from left to right or right to left so that the respective support rows of both pallets are in non-nesting row arrangement.

Referring to the modifications of Figures 14 to 17, the nesting decks 1c and 2c have U shaped support members 3c and 4c open on two sides 5c and having a bottom 6c. This particular design is adaptable to a two-way fork entry pallet. It also differs from the other designs in that the two open sides of the support members make it possible to provide additional strength and interlocking of support members by use of locking members 7c which can be inserted through the open sides 5c of the support members in continuous row arrangement when used singly or when two decks are inverted and assembled to form a double deck type pallet. These longitudinal members 7c could be of the expendable type fabricated from various types of materials. In the single deck application the member 7c serves to support the pallet load. In the double deck pallet application, two decks assembled back to back, the member 7c also serves as a locking member securing the interlocking V-shaped supports together and preventing shifting of the two pallets particularly in the lateral direction.

Although the species disclosed show nesting pallets having nine, ten and twelve nesting support members, it is understood that other numbers of support members can be used to provide a double deck type pallet having interlocking support member arranged in continuous row arrangement when two units are inverted and assembled together. The size and number used in many instances will be determined by the particular application, type and weight of load and applicable method of handling two-way or four-way fork entry. The nesting supports shown in some of the modifications may be provided by several different methods. They can be punched out during fabrication as is commonly done with steel or plastic type products. For pallets made from corrugated paper-board and similar types of material, the supports, both open and closed type, can be provided by cutting holes in the deck and attaching by gluing, stapling, stitching or other means, scored heavy fiberboard strips. Such strips could be extensions of the pallet deck folded over the top of the deck and extending through the cut or punched openings. Use of two separate tapered strips arranged at right angles would provide a closed rectangular shaped support having a nesting feature. While I have disclosed the use of the decks in a double deck pallet, the decks can be used as a top or lid for a cargo type pallet load using another deck at the bottom for supporting the load.

I claim:

1. A pallet comprising a pair of decks, each deck having a deck side adapted to receive a load on its surface and an underside, a plurality of spaced hollow projections extending from the underside, the hollow projections of one deck registering and nesting with the hollow projections of the other deck, when the two decks are assembled for storage, the decks when in spaced apart loading position having the projections on each deck in contact with the underside of the opposite deck to provide for supports for a load on the deckside, the space between the decks when in spaced apart position having substantially the same dimension as the length of the extension of the projections beyond the underside, the projections being in contacting relationship for preventing lateral movement of the decks relative to each other when the decks are in spaced apart assembled relationship.

2. A pallet comprising a pair of decks, each deck having a deck side adapted to receive a load on its surface and an underside, a plurality of spaced hollow projections extending from the underside, the hollow projections of one deck registering and nesting with the hollow projections of the other deck when the two decks are assembled for storage, the decks when in spaced apart loading position having the projections on each deck in contact with the underside of the opposite deck to provide supports for a load on the deckside, the space between the decks when in spaced apart position having substantially the same dimension as the length of the extension of the projections beyond the underside, a plurality of asymmetrically positioned projections the sides of which are in laterally contacting relationship for preventing lateral movement of the decks relative to each other when in spaced apart assembled relationship.

3. The pallet of claim 1 in which the sides of the projections on one deck engage the sides of projections on the opposite deck when the decks are in spaced apart assembled relationship.

4. The pallet of claim 2 in which the decks when in nested position and spaced apart position are oriented respectively 180° in the planes of the decks.

5. The pallet of claim 1 in which the projections are semi-circular, and when in spaced apart position of the decks, the diameter walls of the projections of each deck being in contact.

6. The pallet of claim 1 in which the projections are triangular, one of the sides of each projection being at right angles to the deck and when in spaced apart position of the decks, the said side of each projection being in contact.

7. The pallet of claim 1 in which the projections are rectangular, one of the sides of each projection being at right angles to the deck and when in spaced apart position, the said side of each projection being in contact.

8. The pallet of claim 1 in which the projections have two open sides to form a U.

9. The pallet of claim 1 in which the projections have two open sides to form a U and locking members inserted through the open sides.

References Cited in the file of this patent

UNITED STATES PATENTS

| | | |
|---|---|---|
| 2,479,728 | Darling | Aug. 23, 1949 |
| 2,621,006 | Norrefeldt | Dec. 9, 1952 |
| 2,699,912 | Cushman | Jan. 18, 1955 |
| 2,779,487 | Harris | Jan. 29, 1957 |